United States Patent [19]

Garces et al.

[11] Patent Number: 5,450,306

[45] Date of Patent: Sep. 12, 1995

[54] CLOSED LOOP PULSE WIDTH MODULATOR INVERTER WITH VOLT-SECONDS FEDBACK CONTROL

[75] Inventors: Luis J. Garces, Raleigh; James W. Sember, Zebulon, both of N.C.

[73] Assignee: Square D Company, Palatine, Ill.

[21] Appl. No.: 987,498

[22] Filed: Dec. 7, 1992

[51] Int. Cl.$^6$ .............................................. H02M 1/12
[52] U.S. Cl. ...................................... 363/41; 363/58; 363/98; 363/132
[58] Field of Search ................ 363/41, 58, 98, 132; 318/811

[56] References Cited

U.S. PATENT DOCUMENTS

| | | |
|---|---|---|
| 3,967,173 | 6/1976 | Stich . |
| 4,597,037 | 6/1986 | Okado ................................. 363/41 |
| 5,099,408 | 3/1992 | Chen et al. ........................ 363/41 |
| 5,151,637 | 9/1992 | Takada et al. ..................... 318/376 |

Primary Examiner—Steven L. Stephan
Assistant Examiner—Shawn Riley
Attorney, Agent, or Firm—Michael J. Femal; Richard J. Graefe; Larry I. Golden

[57] ABSTRACT

A closed loop pulse width modulator (PWM) inverter corrects for variations and distortion in the output AC voltage waveform caused by non-linearities of the switching devices or changes in the DC link voltage. A signal is generated that is a volt-seconds representation of the voltage error between a voltage command and the actual AC output voltage of the PWM inverter. The volt-seconds error signal becomes a controlling means in the closed loop of the PWM inverter to regulate the output AC voltage of the PWM inverter. Another signal that represents changes in the DC link voltage also modifies the voltage command signal. The system will compensate for the non-linear behavior of the PWM inverter due to deadtime, minimum on-times and off-times, and DC link voltage variations and voltage drops across the switching devices, and will also allow the operation of the inverter in a linear fashion for the region of operation when one or more of its phases are saturated, i.e., either full on or full off.

21 Claims, 5 Drawing Sheets

CLOSED LOOP PULSE WIDTH MODULATOR INVERTER WITH VOLT-SECONDS FEDBACK CONTROL

TECHNICAL FIELD

Applicants' invention relates generally to adjustable frequency drives with a pulse width modulator inverter used to control induction motors, and more particularly to a system to correct distortion in the output AC voltage waveform caused by non-linearities of the switching devices or changes in the DC link voltage.

BACKGROUND ART

Adjustable frequency drives to control induction motors based on a pulse width modulator (PWM) voltage source inverter are well known. The PWM generates signals to control conduction of electronic switching devices in a power output driver circuit that supplies power to the motor. These switching devices could be power transistors, MOSFETs, IGBTs, GTOs, or other power devices that are connected across a DC bus in series connected pairs for each phase of the motor. These devices are complementary switched for each phase, meaning that only one of the pair of devices will be on at any instant in time. A common type of PWM utilizes a sine wave as a reference serving as the voltage command that is modulated by a triangular waveform of constant amplitude. Whenever the voltage command is larger than the triangular waveform, the appropriate switching device is turned on to apply a positive voltage from the DC bus to the output, and if the voltage command is less than the triangular waveform, the appropriate switching device is turned on to apply a negative voltage from the DC bus to the output. This type of PWM constitutes an open loop control of the output voltage and does not compensate or regulate the output voltage for nonlinearities caused by changes in the DC bus or characteristics of the switching devices.

These nonlinearities can be categorized into different causes that are the results of the techniques used to generate the voltage commands. A quantization effect occurs in digital systems since timing signals occur at discrete time intervals and so exact values for all pulse widths may not be attainable. To prevent a short circuit of the DC bus, a fixed lockout or deadtime is added to the time that one of the pair of devices is turned-off and the other device is turned-on. This deadtime is chosen to allow for finite turn-off and turn-on times of the complimentary devices and to insure that one of the pair is completely off before the other is turned on. This deadtime will result in a distortion in the voltage waveform since the output of the inverter at this time will not be controlled by the switching devices but will be a function of the output load current and the power factor of the motor. Related to deadtime is a minimum dwell time requirement for the switching devices to insure that they are completely off before they are commanded to turn on again. There may also be minimum on-times to ensure that devices are completely turned on and snubber circuits are discharged. When the devices are turned on there is an additional voltage error due to non-zero voltage drops across the devices. As a result there can be an error if the PWM control calculates a pulse width that is shorter than the dwell time.

The result of these nonlinearities will be an error voltage between the command voltage from the PWM and the actual output voltage that will have the appearance of an offset voltage.

To eliminate some of the effects of deadtime, various methods have been devised to provide some type of hardware or software compensation circuit. A common method is to insert a fixed or predetermined offset to the PWM signals according to the load current polarity to correct for the distortion caused by the deadtime. This type of closed loop voltage regulator will be effective for removing some of the nonlinearities of the drive system. However, since it functions outside of the PWM generator, it can not compensate for variations in the DC bus voltage coupled through the DO link or other causes of delays. Also, there will be errors in sampling of the output current. These errors result in a reduction in the fundamental voltage component and an increase in lower order harmonics which will cause excessive ripple current and torque pulsations in the motor. There will be a greater tendency towards instability for motors that are lightly load.

Another type of compensation scheme as outlined in U.S. Pat. No. 5,099,408 modifies the pulse widths of the PWM signals by adding or subtracting a predetermined amount to the pulse width on the basis of the polarity of the current as determined by detected zero crossings of the output current. The modification occurs in only one phase and also does not compensate for variations in the DC link. Its main objective is to correct for the influences of deadtime only.

The present invention eliminates these and other problems without loss of performance or reliability.

SUMMARY OF THE INVENTION

Accordingly, the principal object of the present invention is to provide a closed loop pulse width modulator (PWM) inverter that corrects for variations and distortion in the output AC voltage waveform caused by non-linearities of the switching devices or changes in the DC link voltage.

It is a further object of the invention to generate a signal that is a volt-seconds representation of the voltage error between a voltage command and the actual AC output voltage of the PWM inverter.

Another object of the invention is to utilize the volt-seconds error signal as the controlling means in the closed loop of the PWM inverter to regulate the output AC voltage of the PWM inverter.

In the preferred embodiment of the present invention, these objectives are met by a system that modifies a voltage command based on the volt-seconds error signal and a signal that represents changes in the DC link voltage. The system described herein will compensate for the non-linear behavior of the PWM inverter due to deadtime, minimum on-times and off-times, and DC link voltage variations and voltage drops across the switches, and will allow the operation of the inverter in a linear fashion for the region of operation when one or more of its phases are saturated, i.e., either full on or full off.

The system measures a voltage between the center tap of an impedance connected across the DC link and one of the AC output lines generated by the PWM inverter and going to the motor or other load. In an ideal multiphase system, the ungrounded neutral voltage will be at the same potential as the center tap voltage. Therefore the measured voltage will be the line to neutral voltage of the AC output line. This voltage will be scaled and converted by a voltage controlled oscillator (VCO) to a pulse stream whose frequency will be directly proportional to the magnitude of the measured voltage. These pulses are then fed to a counter that is read at a given and fixed time interval. The difference between two consecutive readings of the counter will be the integral of v, the line to center-tap voltage over the time interval. If the system utilizes a constant sampling time, this difference between two readings will be directly proportional to the average measured AC output line voltage during the sampling time and will be scaled as volt-seconds.

The output of the system ideally will be coincident with the voltage command signal. The voltage command could be the output of a current loop or other type of controller for controlling the overall operation of the system. The controller calculates the needed voltage to sustain a regulated current, for instance. The voltage command signal is compared with the average measured AC output line voltage. The difference is integrated to generate an error signal that is then added to the modified voltage command signal to produce a new and modified voltage command signal that is fed to the PWM circuit.

In one version, the PWM circuit uses a triangular waveform as the carrier that is modulated with the modified voltage command signal to produce the gate drive signals for energizing the power switching devices connected across the DC link to power the motor or load. Other types of modulation including space vector PWM and trapezoidal PWM are possible. A deadtime delay circuit prevents the gate drive signals from energizing the power switching devices connected in series across the DC link at the same time to prevent a short circuit of the DC link.

The system described is repeated for each of the N-phases of the inverter. Although the system could be implemented completely in hardware using analog regulators and other linear circuitry, a digital implementation with a central processing unit (CPU) or an ASIC is more desirable. An analog solution becomes quite complex and introduces DC offset voltages that can affect feedback signals and other errors.

Other features and advantages of the invention will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
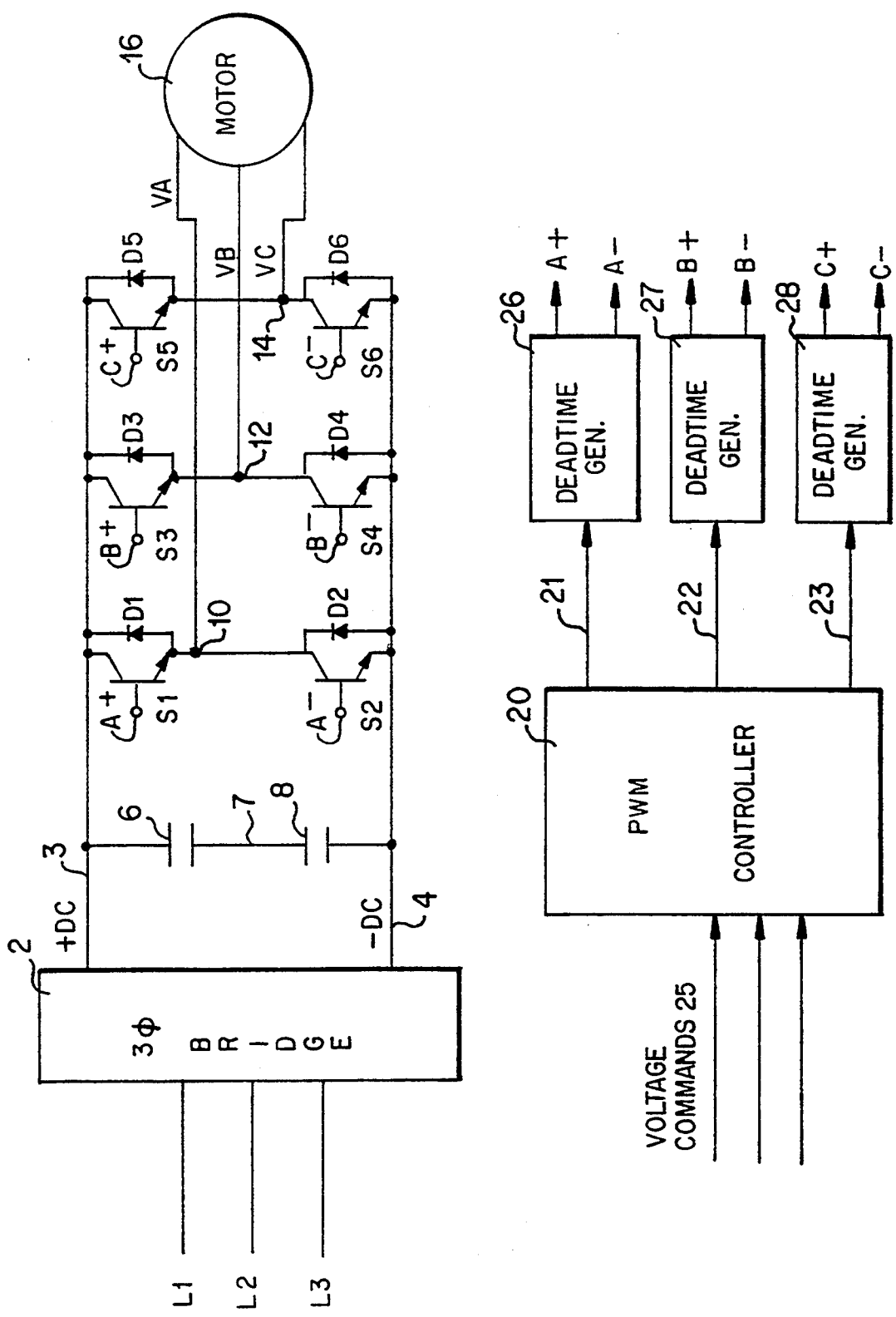
FIG. 1 is a block diagram of a three phase PWM controller representative of prior art.

FIG. 1 illustrates a block diagram of a three phase PWM controller representative of prior art. Three phase AC power L1, L2, and L3 is inputted to a bridge circuit 2 to create a DC link voltage having a positive DC rail 3 and a negative DC rail 4. Equal impedances 6, 8 combine to produce a voltage at 7 that is at a potential midway between the DC rails 3 and 4. Electronic switches S1–S6 are connected as three complementary pairs across the DC link voltages 3, 4. The common terminal 12, 13, and 14 of each switch pair is connected to respective phases of motor 16. Although power transistors are shown, these switching devices S1–S6 could also be MOSFETs, IGBTs, GTOs, or other types of power semiconductors. A PWM controller 20 generates drive signals 21–23 in response to a 3 phase voltage command signal 25 which could be the output of a current mode outer control loop, a speed command or other similar source that determines the frequency and phase relationship of the output voltages VA, VB, and VC. To prevent complementary pairs of transistors T1–T2, T3–T4, and T5–T6 from being on at the same time, a deadtime generator 26–28 for each phase will provide a predetermined time delay between one transistor turning-off and its complement turning-on. Thus base drive signals A+ and A− will never be positive at the same time. Diodes D1–D6 provide the means for current flow to the motor 16 when both transistors in a pair are turned-off.

Figure 2:
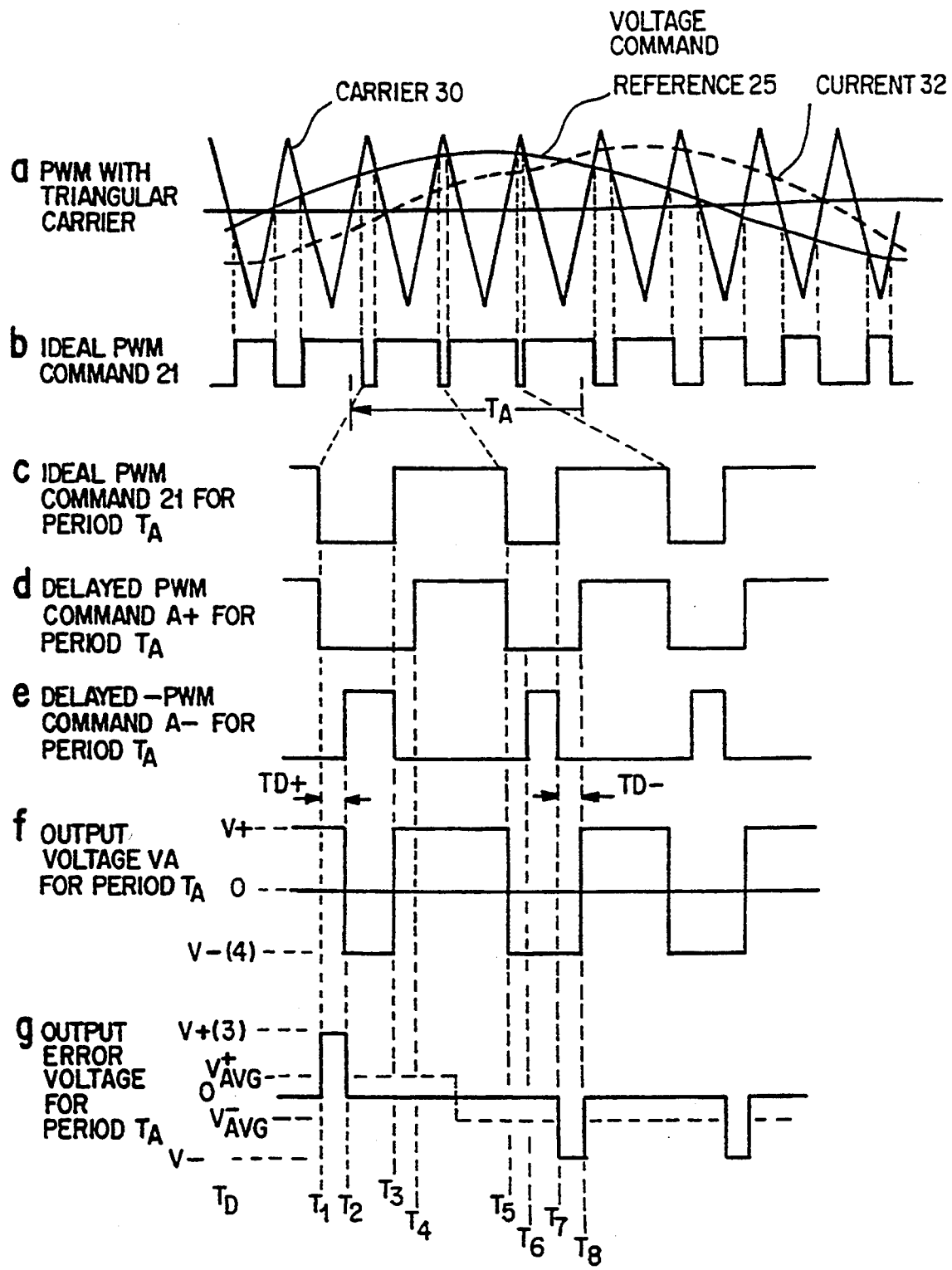
FIG. 2 is a series of waveforms illustrating the effects of deadtime on the output voltage waveform of the system of FIG. 1.

FIG. 2 provides details of a series of waveforms for a period TA for the single phase VA to illustrate the effects of deadtime on the output voltage waveform of the system of FIG. 1. The PWM controller 20 will modulate the voltage command signal 25, normally characterized as a sine wave with a triangular carrier waveform 30 of constant amplitude. Whenever the voltage command 25 is larger than the triangular waveform 30, switching device S1 is turned on to apply a positive voltage from the positive DC bus 3 to the output VA, and if the voltage command 25 is less than the triangular waveform 30, the opposite switching device S2 is turned on to apply a negative voltage from the negative DC bus 4 to the output VA. Thus, in FIG. 2a the voltage command 25 is superimposed in time with the triangular waveform 30, along with a theoretical resultant current waveform 32. Based on the comparison between the two, the PWM controller will generate the ideal PWM command 21 shown in FIG. 2b and expanded for greater detail for period TA in FIG. 2c. The deadtime generator 26 will delay each of the positive going pulses of base drive signal A+ by a fixed time delay of TD+ as shown in FIG. 2d and will delay each of the positive going pulses of base drive signal A− by an equal fixed time delay of TD− as shown in FIG. 2e. Transistors S1 and S2 will be switched on and off by the corresponding base drive signals A+ and A− to produce the output voltage VA of FIG. 2f. Before time T1, transistor S1 is conducting and applies the +DC link voltage 3 to the output VA. At time T1, base drive signal A+ goes negative, turning off transistor S1. A theoretical resultant current waveform 32 shown on FIG. 2a indicates negative load current at time T1. Diode D1 will continue to conduct the negative load current and maintain VA essentially at the +DC link voltage 3 until the opposite switching device, transistor S2, is turned on at time T2 due to the positive base drive signal A−. The interval between times T1-T2 is represented by the time TD− and results in a positive error voltage having a magnitude equal to the +DC voltage 3 and pulse width TD−. At time T2, transistor S2 will cause the output voltage VA to equal the −DC voltage 4 until it is turned-off at time T3. Diode D1 will return to conduct the negative load current and the output voltage VA will return to the +DC voltage 4 level. Transistor S1 will start conduction after receiving the delayed positive base drive signal A+ at time T4 and will maintain the output voltage VA at the +DC voltage 3. The interval between times T3-T4 is represented by the time TD+. Transistor S1 will continue conduction until the base drive signal A+ goes negative at time T5.

During the time interval between T4 and T5, the load current 32 becomes positive. Therefore, at time T5, diode D2 will conduct the positive load current and the output voltage VA will switch to the −DC voltage 4 and will be maintained at that level through the interval T5-T6. At time T6 the delayed positive base drive signal A− will turn-on transistor S2. The output voltage VA will remain at the −DC voltage 4 after transistor S2 has turned off at time T7 due to diode D2. This results in a negative error voltage having a magnitude equal to the −DC voltage 4 and pulse width TD+. FIG. 2g shows the error pulses over the period TA, the result being similar to adding a square wave of voltage having an amplitude equal to the average of the error pulses to the output voltage VA. This will cause a distortion in the voltage waveform and is a direct result of the added deadtime generation circuits 26-28. The distortion will be dependent on the carrier frequency, power factor of the motor, and polarity of the load current. Further distortions will also result from variations in the +DC and −DC link voltages 3 and 4 respectively, from voltage drops across the transistors S1 and S2 and from minimum on-times and off-times which delete and stretch the entire pulse.

Figure 3:
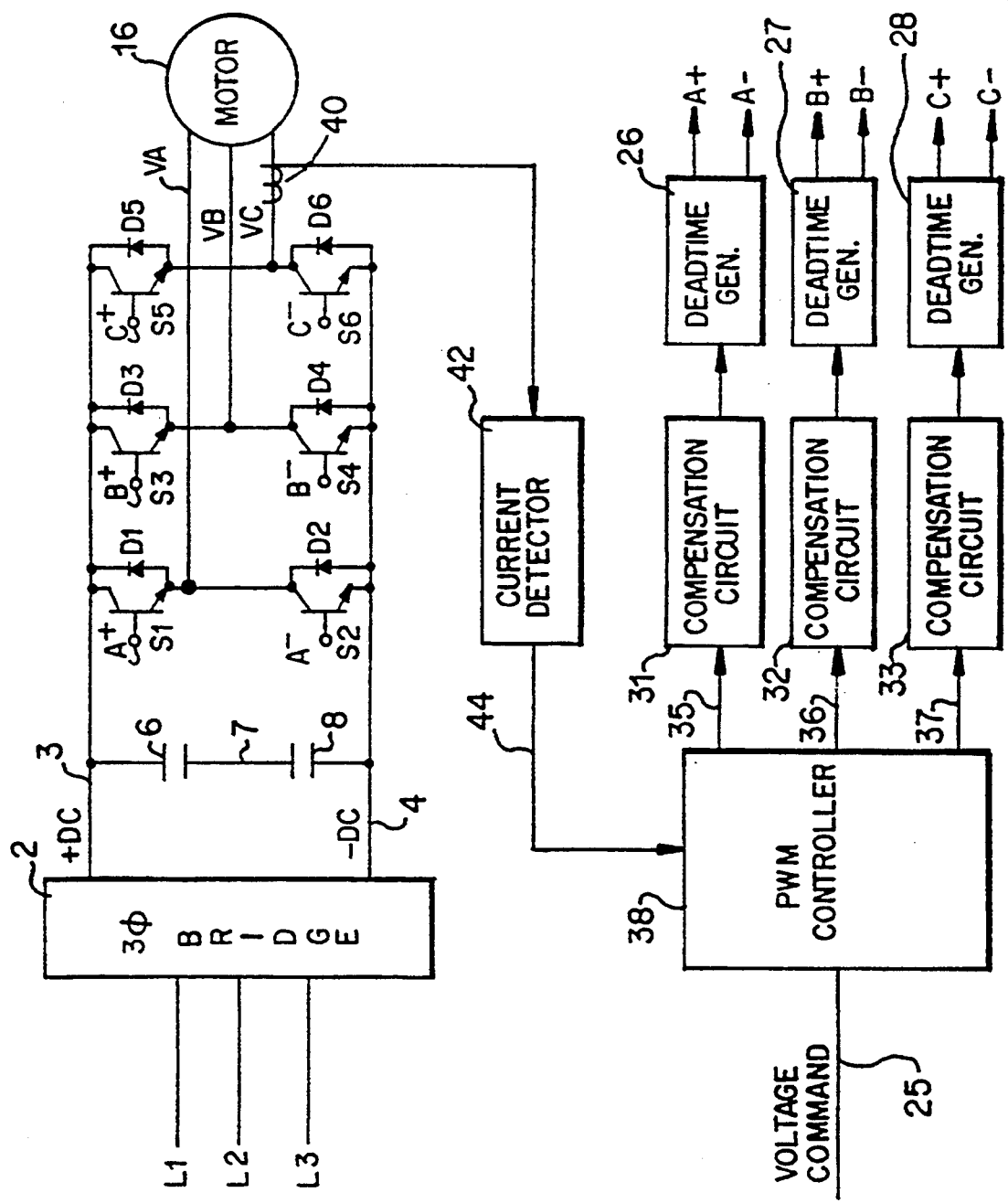
FIG. 3 is a block diagram of a three phase PWM controller with deadtime compensation representative of prior art.

As a means to correct this distortion, the prior art open loop system depicted in FIG. 3 adds compensating circuits 31-33 to the PWM command signals 35-37 generated by PWM controller 38. A current sensor 40 located in one phase of motor 16 provides an input to a current detector 42 which determines current zero crossings 44 of that phase. The PWM controller 38 uses the current zero crossings for timing purposes in the PWM controller to determine the polarity and the voltage phase in which to add the voltage compensation to the PWM command signals 35-37. The compensation circuits 31-33 will modify the command signals by changing the pulse width of the PWM command signals 35-37 depending on the relationship of the detected current zero crossing. During the time of positive current flow in a particular phase, this compensation will expand the positive side and contract the negative side of the PWM pulse which will increase the positive output voltage of the phase and equalize the effects of the negative error voltages as shown in FIG. 2g. Similarly, during the time of negative current flow in a particular phase, this compensation will contract the positive side and expand the negative side of the PWM pulse which will increase the negative output voltage of the phase and equalize the effects of the positive error voltages as shown in FIG. 2g. The deadtime generators 26-28 are still required to prevent the possibility of a short circuit of the DC link voltages as before. The resulting output voltage distortion in VA, VB, and VC will be greatly reduced but there is no compensation for variations in the +DC and −DC link voltages 3 and 4 respectively, for minimum on-times and off-times, for non-zero voltage drops across the switches, for non-zero turn-on and off-times, for nonuniform implementation of the dead times from switch to switch, and for amplitude of the command voltage 25 that exceeds the amplitude of the PWM carrier 30.

Figure 4:
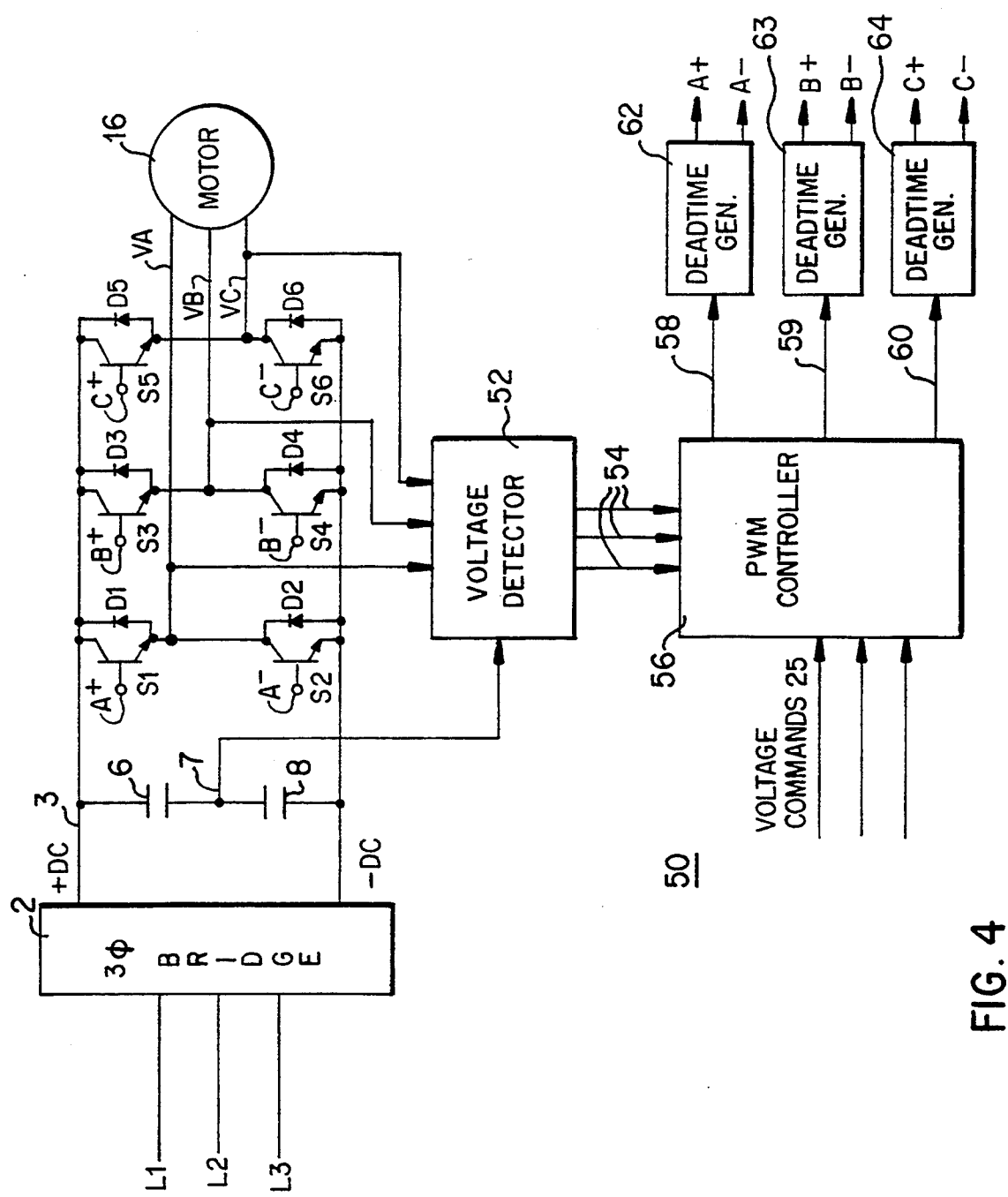
FIG. 4 is a basic block diagram of a PWM control with deadtime compensation constructed according to the present invention.

The closed loop system 50 illustrated in FIG. 4 and representative of the present invention, overcomes these and other disadvantages. As before, three phase AC power L1, L2, and L3 is converted by bridge circuit 2 to create the DC link voltage having a positive DC rail 3 and a negative DC rail 4. Equal impedances 6, 8 combine to produce the voltage at 7 that is at the center point between the rails 3, 4. The ungrounded neutral voltage of the motor 16 will be on the average, at the same potential as the center tap voltage. A voltage detector 52 measures a voltage 7 between the center tap and each of the AC output lines VA, VB, and VC generated by the PWM inverter and going to the motor 16. The measured voltage will be equal to the line to neutral voltage of the AC output line of each phase for the case of equal impedances. Each phase voltage will be scaled and converted to three pulse streams 54 whose frequency will be directly proportional to the magnitude of the respective measured voltage. These pulses 54 are then fed to a PWM controller 56 that will provide a difference signal between two consecutive readings that is equivalent to the integrals of VA, VB, and VC over the time interval between the readings. The difference between two readings will be directly proportional to the average measured AC output line voltage during the sampling time and will be scaled as volt-seconds.

The average AC output lines VA, VB, and VC of the system 50 ideally will be identical with the voltage command signal 25. As previously mentioned, the voltage command 25 could be the output of a current loop or other type of controller and is not the object of the present invention. The voltage command signal 25 is compared with the proportional average measured AC output line voltage. The difference is integrated to generate an error signal that then modifies the voltage command signal to produce a new voltage command signal. A further modification to the voltage command signal corrects for variations in the DC link voltage. The new modified voltage command signal 92 is fed to PWM controller 56 which will modulate it with a triangular or trapezoidal carrier to produce the PWM command signals 58-60. Deadtime generators 62-64 will insert the necessary time delay to base drive signals A+, A−, B+, B−, C+, and C− to prevent the possibility of a short circuit of the DC link voltages as discussed before. The resulting output voltage distortion in VA, VB, and VC will be essentially eliminated since the effects of the added deadtime will result in an error between the average measured AC output line voltage and the voltage command signal 25. The error will continuously modify the voltage command signal, reducing the output distortion until it approaches zero and the AC output line voltages VA, VB, and VC are proportionately equal to the voltage command signals 25. The variations in the +DC and −DC link voltages 3, 4 and other introduced nonlinearities will also have no effect on the AC output voltage.

Figure 5:
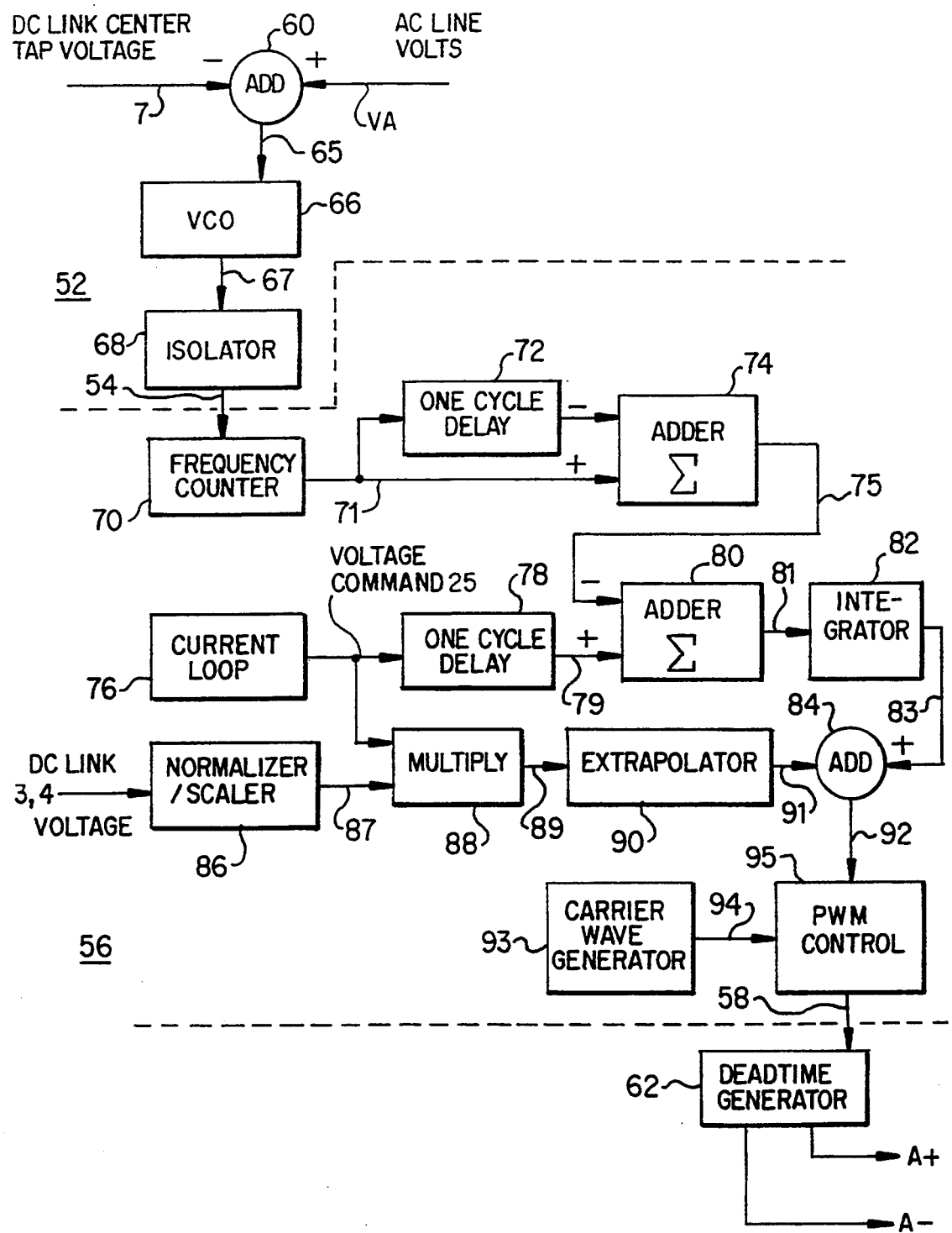
FIG. 5 is a detailed block diagram of the PWM control of FIG. 4 constructed according to the present invention.

Referring now to FIG. 5, a detailed functional block diagram for one phase of the PWM control 50 of FIG. 4 constructed according to the preferred embodiment of the present invention is shown. The voltage detector 52 measures a voltage between the center tap 7 and the AC output line VA generated by the PWM inverter. The voltage 7 is fed to one input of differential amplifier 60. The other input is the AC output voltage VA. The output 65 is proportional to the line to neutral voltage of the AC output line of phase VA. A voltage controlled oscillator (VCO) 66 converts output 65 to a pulse stream 67 whose frequency will be directly proportional to the magnitude of the line to neutral voltage of the AC output line of phase VA. Since the power output portion of inverters are at high voltage and normally isolated from the control portion of the inverter, isolator 68 is used to provide this isolation. The output of the isolator 68 and thus the voltage detector 52 will be pulse stream 54 previously detailed. These pulses 54 are then fed to a PWM controller 56, the details of which follows.

Pulses 54 are coupled to digital frequency counter 70. At a constant sampling time or period, the counter 70 will be read and reset for accumulating the count for the next sampling period, with the reading 71 becoming a digital representation of the measured line to neutral voltage of the AC output line of phase VA. Reading 71 is stored in an one cycle delay circuit 72. Output 73 of the one cycle delay circuit 72 will be one input to adder 74. The other input will be reading 71 of the counter 70 from the next sampling period. Adder 74 will thus provide a difference signal 75 between two consecutive readings 71 that is equivalent to the integral of the AC output line voltage of phase VA over the time interval between the readings measured in volt-seconds. The difference signal 75 will be directly proportional to the average measured AC output line voltage during the sampling time.

A current loop control or other type of controller 76, not an object of the invention, generates the voltage command signal 25 to obtain the needed voltage. The closed current loop will add the necessary corrections to a pre-computed voltage to allow for current limiting, short circuits, brownouts, and other similar conditions. The voltage command signal 25 is appropriately scaled and fed to a delay circuit 78 to create an output 79 which will be coincident in time and equivalent in measured units with the difference signal 75. The output 81 of adder 80 then will be an accurate representation of the difference between the voltage command signal 25 and the measured line to neutral voltage of the AC output line voltage of phase VA. Output 81 is integrated by integrator 82 to produce an error 83 in volt-seconds that must be added to the voltage command signal 25 until the AC output line voltage equals the voltage command signal 25. Output 83 becomes one input to adder circuit 84.

To correct for variations in the DC link voltage 3, 4 that would cause variations in the AC output voltage VA, a scaling and normalizing circuit 86 modifies the DC link voltage to produce a factor 87 that is equal to the measured voltage divided by the rated voltage. This factor will then be multiplied with the voltage command signal 25 by multiplier 88 to create a modified voltage command signal 89 that is inversely proportional to the link voltage 3, 4. This will correct for a loss in gain that an increase or decrease in the DC link voltage will cause in the AC output voltage. An optional extrapolator 90 can generate an approximation of the modified voltage command signal 89 to allow for operation of the DC voltage link modifying circuits 86 at a lower sampling rate than the higher frequency of the PWM modulator circuits. The output 91 of the extrapolator 90 will be the ideal or desired voltage command signal that will be further modified by adder circuit 84 with the addition of the volt-seconds error 83 to produce the voltage reference sine wave signal 92. Frequency wave generator 93 will produce the carrier triangular or trapezoidal waveform 94 for comparison with the reference sine wave signal 92 in PWM modulator 95 to generate drive signal 58. Dead time generator 62 will create the base drive signals A+ and A− with added deadtime to cause appropriate conduction of transistors S1 and S2. The result will be that the AC output voltage VA will be closely regulated with compensation for not only the voltage distortion that is normally caused by the deadtime delays inserted in the base drive signals, but also for variations in the DC link voltage.

The circuits described above are repeated for each of the phases of the inverter. The triangular carrier signal 94 used as the modulation command must be the same for each of the separate phases to prevent undesirable harmonics in the AC voltage outputs. As a result, a variation to the compensation scheme for correcting variations in the DC link voltage would be to multiply the normalized DC link voltage with the carrier signal 94 instead of with the voltage command signals 25. This will have the same effect with fewer multiplications required in the overall system but will require greater resolution.

The above description can be implemented in discrete hardware circuitry but is more adaptable for microprocessor or ASIC based systems. Details of adders, integrators, counters, and so on are well known to those skilled in the art and not described herein. While the specific embodiments have been illustrated and described, numerous modifications are possible without departing from the scope or spirit of the invention.

We claim:

1. A closed loop pulse width modulator for converting DC to AC electrical power comprising:

a) a DC source voltage;
   b) an inverter switching means connected across said DC source voltage to produce said AC electrical power in response to switching command signals generated by a PWM command circuit, said PWM command circuit generating said switching command signals in accordance with a voltage command signal;
   c) an on-delay means for preventing said switching command signals from causing said inverter switching means from short-circuiting said DC source;
   d) a first voltage detection means for measuring said DC source voltage to detect variations in said DC source voltage;
   e) a second voltage detection means for measuring said AC electrical power and generating a voltage error signal that represents a difference between the voltage command signal and the AC electrical power;

f) an integration means for converting said voltage error signal to a volt-seconds representation of said voltage error signal;

g) a scaling and normalizing circuit and a multiplier for modifying said voltage command signal for said variations in said DC source voltage: and h) wherein said volt-seconds representation of said voltage error signal further modifies said voltage command signal until said voltage error signal is equal to zero, said modification to continuously correct for distortions in said AC electrical power caused by said on-delay means.

2. The closed loop pulse width modulator of claim 1 wherein said modified voltage command signal is inversely proportional to said DC voltage source, said DC voltage source providing a DC link voltage and having a predetermined voltage rating.

3. The closed loop pulse width modulator of claim 2 wherein said normalizing circuit generates a normalized DC link voltage equal to said measured DC voltage source divided by said voltage rating, said normalized DC link voltage coupled to said multiplier and multiplied by said voltage command signal to create said modified voltage command signal.

4. The closed loop pulse width modulator of claim 3 wherein said modifying means of said voltage command signal further includes an extrapolation circuit coupled to said multiplier for generating an approximation of said voltage command signal to allow operation of said modifying means at a frequency higher than said AC electrical power.

5. The closed loop pulse width modulator of claim 3 wherein said modified voltage command signal is added to said volt-seconds representation of said voltage error signal to produce a voltage reference sine wave signal.

6. The closed loop pulse width modulator of claim 5 wherein said voltage reference sine wave signal is coupled to a comparator for comparison with a carrier waveform signal generated by a frequency wave generator in said PWM command circuit, said comparator for generating said switching command signals.

7. The closed loop pulse width modulator of claim 6 wherein said carrier waveform signal is a triangular waveform.

8. The closed loop pulse width modulator of claim 6 wherein said carrier waveform signal is a trapezoidal waveform.

9. The closed loop pulse width modulator of claim 1 wherein said PWM command circuit includes a microprocessor.

10. The closed loop pulse width modulator of claim 1 wherein said PWM command circuit includes an ASIC or application specific integrated circuit.

11. The closed loop pulse width modulator of claim 1 wherein said PWM command circuit includes a microprocessor.

12. The closed loop pulse width modulator of claim 1 wherein said PWM command circuit includes an ASIC or application specific integrated circuit.

13. The closed loop pulse width modulator of claim 1 wherein said AC electrical power is a single phase system.

14. The closed loop pulse width modulator of claim 1 wherein said AC electrical power is a three phase system.

15. The closed loop pulse width modulator of claim 6 wherein said carrier waveform signal is a triangular waveform.

16. The closed loop pulse width modulator of claim 6 wherein said carrier waveform signal is a trapezoidal waveform.

17. A closed loop pulse width modulator for converting a DC source voltage to an AC output voltage, said DC voltage source having a predetermined voltage rating, said pulse width modulator comprising:

a) an inverter switching means connected across said DC source voltage to produce said AC electrical power in response to switching command signals generated by a PWM command circuit, said PWM command circuit generating said switching command signals in accordance with a voltage command signal;

b) an on-delay means for preventing said switching command signals from causing said inverter switching means from short-circuiting said DC source;

c) a voltage detection means for measuring said AC output voltage and for generating a voltage error signal that represents a difference between said voltage command signal and said AC output voltage;

d) integration means for converting said voltage error signal to a volt-seconds representation of said voltage error signal;

e) first modification means for modifying said voltage command signal for variations in said DC voltage source, and f) second modification means for continuously modifying said voltage command signal with said volt-seconds representation of said voltage error signal until said voltage error signal is equal to zero, said modification means to correct for distortions in said AC output voltage caused by said on-delay means.

18. The closed loop pulse width modulator of claim 17 wherein said first modifying means of said voltage command signal includes a normalizing circuit and a multiplier to create a modified voltage command signal that is inversely proportional to said DC voltage source.

19. The closed loop pulse width modulator of claim 18 wherein said normalizing circuit generates a normalized DC link voltage equal to said measured DC voltage source divided by said voltage rating, said normalized DC link voltage coupled to said multiplier for multiplication with a carrier waveform signal generated by a frequency wave generator in said PWM command circuit to create said modified voltage command signal.

20. The closed loop pulse width modulator of claim 19 wherein said modified voltage command signal is added to said volt-seconds representation of said voltage error signal to produce a voltage reference sine wave signal.

21. The closed loop pulse width modulator of claim 20 wherein said voltage reference sine wave signal is coupled to a comparator for comparison with said carrier waveform signal, said comparator for generating said switching command signals.

* * * * *